J. C. WHEELER & M. COKELY.
Assignor of one-half to H. M. LIVOR.
PULLEY PATTERN MOLDING PRESS.
No. 10,854. Reissued Aug. 2, 1887.
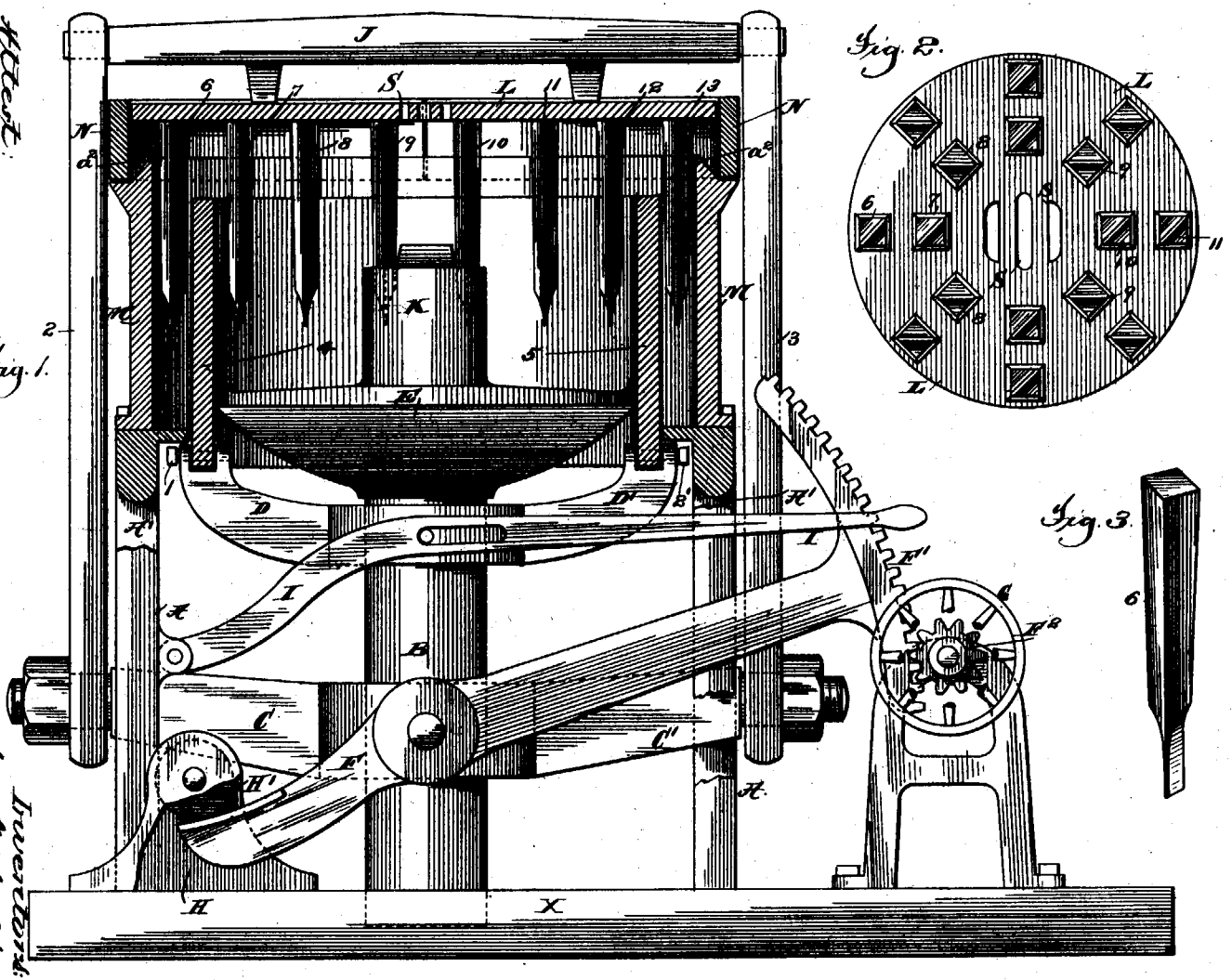
Attest:
Geo. H. Botts
G. M. Dorst
Inventors:
John Cyrus Wheeler & Michael Cokely
by Philipp, Phelps & Hovey
Attys
N. PETERS, Photo-Lithographer, Washington, D. C.

UNITED STATES PATENT OFFICE.

JOHN CYRUS WHEELER, OF FLUSHING, AND MICHAEL COKELY, OF SCHENECTADY, ASSIGNORS OF ONE-HALF INTEREST TO HENRY M. LIVOR, OF BROOKLYN, NEW YORK.

PULLEY-PATTERN-MOLDING PRESS.

SPECIFICATION forming part of Reissued Letters Patent No. 10,854, dated August 2, 1887.

Original No. 342,239, dated May 18, 1886. Application for reissue filed June 15, 1887. Serial No. 241,417.

*To all whom it may concern:*

Be it known that we, JOHN CYRUS WHEELER and MICHAEL COKELY, citizens of the United States, residing, respectively, at Flushing, in the county of Queens and State of New York, and at Schenectady, in the county of Schenectady and State of New York, have invented certain new and useful Improvements in Pulley-Pattern-Molding Presses; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a front elevation, partly in section. Fig. 2 is a bottom plan of plate L, and Fig. 3 is a perspective view of one of the prongs.

Our invention has relation to machines for molding pulleys, &c.; and it consists in the construction and novel combination of parts, as hereinafter set forth, and pointed out in the claims.

Referring by letter to the accompanying drawings, X designates the bed-plate which supports the other portions of the machine.

A designates the base of the machine, which is provided with two vertical slots, A′ A′, in the opposite sides, through which project the press-arms C C′, said press-arms C C′ being connected with the press-plate J by connecting-arms 2 and 3.

B is a vertical spindle or shaft, firmly secured to the bed, on which spindle slide the press-arms C C′.

D D′ are arms which are secured to the rim-pattern 4 5 by screws 1 and 2′.

E designates a plate, which rests upon the top of the vertical shaft or spindle B to support the hub and half-arm pattern K.

H designates a rigid frame, and H′ anti-friction wheels, under which works the inner end of the lever F, the outer end of said lever F terminating in a geared segment, F′, which connects with a small pinion, $F^2$, behind the pulley G.

M M designate the flask, on the top of which rests the ring N N, for holding sufficient sand to press into the flask.

L is a plate with prongs 6 7 8 9 10 11 12 13 attached, which plate is of the same diameter as the flask M M, which plate is designed to press and support the sand in the flask.

I designates a lever attached to the arms D D′, which draws down the rim-pattern after the mold is pressed.

The mode of operating the device is as follows: After the rim-pattern 4 5 has been projected up through the base by means of the lever I, the flask M M is put in place and filled with sand to the top of the ring N N, which rests on the flask. The pronged plate L is then lowered (prongs down) into the sand. The press-plate J, which is hinged through its arms 2 3 to the press-arms C C′, is then brought directly over the plate L. Power is then applied to pulley G, and is transmitted through the pinion $F^2$ to the lever F, which is drawn down by the pinion and segment until the pronged plate L rests on the flask M M, where it is fastened after forcing the sand contained in the ring N N into it. The rim-pattern is then drawn down by the lever I, the press released and swung to one side, the flask lifted away from the top of the base, (where the arm-pattern is stationary,) and a half-mold finished. After another half-mold has been made in the same way both are placed together, and are then ready to receive the metal.

In a finished machine it is intended that the movements of the parts be automatic, and any suitable mechanism may be employed to impart such motion to the parts.

The essential feature of the invention is the pronged plate. It is made of iron with the prongs attached. We do not desire to confine ourselves to any number or shape of prongs, as the machine is designed to produce general foundry-castings, and must be governed by the form of casting required. The ordinary way of making molds for pulleys and other castings of any size is to use cross-bars of wood or iron permanently fastened to the flask, around and between which cross-bars the sand is packed by means of a rammer in the hands of a skilled mechanic, the bars being necessary to support the sand; but by our device the rammer and skilled mechanic are rendered unnecessary, because the prongs by their wedge shape and backed by the plate to which they are attached on being pressed down shove and thoroughly pack the sand around the pattern, and, as this plate is left in the mold until it is cast, it takes the place of the rammer in packing the sand and the bars in supporting it.

The plate works independently of the flask, and is of any required shape—that is, either square, round, &c.—and adapted to any size casting. The prongs may be connected in the form of comb-sections, if desired—that is, connected to a back or rib common to several or all of them. Near the center of the plate are several slots, S, which are to permit some of the sand to escape while pressing the pulley, in order to prevent the mold from being too hard directly over the hub, and also to allow the gases to escape and the metal to enter the mold. The whole plate is simply a device for pressing and also supporting the sand in flasks of such dimensions as require something more to support the sand than its own consistency.

The ring N N is necessary for holding sufficient sand to make the mold of the requisite density after being pressed. The ring N should be a lap or split ring, so that the same may yield to the action of the plate L and allow the surplus sand to pass over the beveled edge $a^2$ of the flask M.

It will be seen that by having the mouth of the flask beveled outwardly edges are presented which will afford no means for the sand remaining thereon; but when the plate L is brought down will force the sand which cannot be pressed into the flask against the ring N and allow the said plate to come down upon the mouth of the flask.

It will be noticed that the inner end of the lever F rests on anti-friction rollers under the frame H and shortens the distance between the frame H and the point at which it is connected with the press-arms C C′ as the latter slide down the spindle or vertical shaft during the operation, thereby greatly increasing the power of leverage.

Having described this invention, what we claim, and desire to secure by Letters Patent, is—

1. The combination, with the bed-plate X, the slotted base, the vertical post B, with plate E and half-pattern K at its upper end, the ring N, flask M M, and pattern, of the pronged plate L, the press-plate J, the arms 2 3, connecting said plate to the press-arms C C′, and the segment-lever F and gearing $F^2$, substantially as specified.

2. The combination, with the bed-plate X, the bars 2, the arms C, the slotted base, the vertical post B, with plate E and half-pattern K at its upper end, the ring N, and flask M, of the pronged plate L, having the central slots, the hinged press-plate, and the compression-levers, as described, for compressing the sand in the flask, substantially as specified.

3. In a molding-machine, the combination, with a flask having an outwardly-beveled mouth, of a yielding ring arranged to engage the bevel, substantially as specified.

4. The combination, in a molding-machine, of a flask having an outwardly-beveled mouth, a yielding ring, and a pronged plate adapted to move within the ring, substantially as specified.

5. The combination, with a flask and the sand therein, of the plate L, provided with the prongs 6 7, &c., for pressing the sand into the flask around the pattern and for sustaining the molded sand, as set forth.

In testimony whereof we affix our signatures in presence of two witnesses.

JOHN CYRUS WHEELER.
MICHAEL COKELY.

Witnesses to the signature of John C. Wheeler:

SPILLETT SMITH,
JAMES S. SMITH.

Witnesses to the signature of Michael Cokely:

THOMAS W. THORNTON,
WINFIELD J. SISSONS.